United States Patent
Lee et al.

(10) Patent No.: US 8,310,684 B2
(45) Date of Patent: Nov. 13, 2012

(54) SYSTEM AND METHOD FOR LOCALIZING A CARRIER, ESTIMATING A POSTURE OF THE CARRIER AND ESTABLISHING A MAP

(75) Inventors: Chin-Lung Lee, Zhongli (TW); Yen-Chung Chang, Hsinchu (TW); Hung-Hsiu Yu, Changhua (TW)

(73) Assignee: Industrial Technology Research Institute, Hsinchu (TW)

( * ) Notice: Subject to any disclaimer, the term of this patent is extended or adjusted under 35 U.S.C. 154(b) by 266 days.

(21) Appl. No.: 12/832,751

(22) Filed: Jul. 8, 2010

(65) Prior Publication Data
US 2011/0141485 A1   Jun. 16, 2011

(30) Foreign Application Priority Data

Dec. 16, 2009   (TW) .............................. 98143217 A

(51) Int. Cl.
G01B 11/14   (2006.01)
(52) U.S. Cl. ....................................................... 356/614
(58) Field of Classification Search .................. None
See application file for complete search history.

(56) References Cited

U.S. PATENT DOCUMENTS

| | | | |
|---|---|---|---|
| 6,176,837 B1 | 1/2001 | Foxlin | |
| 6,409,687 B1 | 6/2002 | Foxlin | |
| 6,480,152 B2 | 11/2002 | Lin et al. | |
| 7,376,262 B2 | 5/2008 | Hu et al. | |
| 2005/0125142 A1 | 6/2005 | Yamane | |
| 2008/0195316 A1 | 8/2008 | Krishnaswamy | |
| 2008/0269963 A1 | 10/2008 | Vos et al. | |
| 2008/0270027 A1* | 10/2008 | Stecko et al. | 701/214 |
| 2010/0274481 A1* | 10/2010 | Krishnaswamy et al. | 701/208 |

FOREIGN PATENT DOCUMENTS

| | | |
|---|---|---|
| CN | 100522056 | 8/2001 |
| CN | 1569558 | 1/2005 |

OTHER PUBLICATIONS

Chinese language office action dated Jan. 18, 2012.
English language translation of abstract of CN 100522056 (published Aug. 15, 2001).
English language translation of abstract of CN 1569558 (published Jan. 26, 2005).

* cited by examiner

*Primary Examiner* — Tu Nguyen
(74) *Attorney, Agent, or Firm* — McClure, Qualey & Rodack LLP

(57) ABSTRACT

Provided is a system for localizing a carrier, estimating a posture of the carrier and establishing a map. The system includes: an inertial measurement device, measuring a motion state and a rotation state of the carrier; a vision measurement device disposed on the carrier for picturing an environment feature in an indoor environment where the carrier locates; and a controller receiving measuring results from the inertial measurement device and the vision measurement device to estimate a posture information, a location information and a velocity information of the carrier, and establishing a map having the environment feature. The controller estimates based on a corrected measuring result from one of the inertial measurement device and the vision measurement device, then controls the other one of the inertial measurement device and vision measurement device to measure, and accordingly corrects the posture, location and velocity information of the carrier and the map.

13 Claims, 3 Drawing Sheets

SYSTEM AND METHOD FOR LOCALIZING A CARRIER, ESTIMATING A POSTURE OF THE CARRIER AND ESTABLISHING A MAP

This application claims the benefit of Taiwan application Serial No. 98143217, filed Dec. 16, 2009, the subject matter of which is incorporated herein by reference.

TECHNICAL FIELD

The disclosure relates in general to a system and method for localizing a carrier, estimating a posture of the carrier and establishing a map by using measurement devices, and more particularly to a system and method for localizing a carrier, estimating locations of environment features and establishing a map by using a plurality of measurement devices having complementary measurement characteristics.

BACKGROUND

Outdoor positioning systems, such as global positioning system (GPS), have been widely applied in car navigation systems to localize a car or a person outdoors. However, indoor positioning systems still have many problems to be solved. The indoor positioning systems are subjected to that (1) electromagnetic signals are easily sheltered in the indoor environment such that satellite signals cannot be received and (2) the changing indoor environments (such as indoor objects and persons) easily.

The present indoor positioning technology has two types: an external positioning system and an internal positioning system. The external positioning system, for example, estimates the location of an object (for example a robot) in a space based on a relative relationship between an external sensor and a receiver of the robot. In the internal positioning system, for example, a sensor is located in the robot and the information sensed by the sensor is compared with a built-in map to estimate the location of the robot in the space.

The external positioning system has a high positioning speed, but requires an external sensor which is installed beforehand. Once the external sensor is moved or sheltered, the system cannot do positioning any more. When applied in a large area, the external positioning system requires more sensors and thus much more cost.

The internal positioning system has a lower positioning speed but a larger extensibility. Even in the environment that changes easily, as long as there exists at least one environment feature for positioning, the internal positioning system can still do positioning. However, the internal positioning system needs to build a map of the indoor environment before positioning.

BRIEF SUMMARY

Exemplary embodiments of the disclosure are directed to a system and method for positioning a moving carrier and calculating relative positions (relative to the moving carrier) of environment feature in a three-dimensional space by using both an inertial measurement unit (IMU) and a vision measurement device to achieve synchronously localization, posture estimation and environment-map establishment. The environment feature at least includes environment point, environment line or environment plane.

According to a first exemplary embodiment of the present disclosure, provided is a system for localizing a carrier, estimating a posture of the carrier and establishing a map. The system includes an inertial measurement device for measuring a motion state and a rotation state of the carrier; a vision measurement device disposed on a surface of the carrier for picturing at least an environment feature in an indoor environment where the carrier locates; and a controller for controlling the inertial measurement device and the vision measurement device, receiving a measuring result from the inertial measurement device and a measuring result from the vision measurement device to estimate a posture information, a location information and a velocity information of the carrier, and establishing a map having the environment feature. The controller estimates based on a corrected measuring result of one of the inertial measurement device and the vision measurement device, and then the controller controls the other one of the inertial measurement device and the vision measurement device to measure and accordingly corrects the posture information, the location information and the velocity information of the carrier and the map.

According to a second exemplary embodiment of the present disclosure, provided is a method for localizing a carrier, estimating a posture of the carrier and establishing a map. The method includes measuring a motion state and a rotation state of the carrier by using an inertial measurement device; picturing at least an environment feature of an indoor environment where the carrier locates; and estimating based on a corrected measuring result of one of the inertial measurement device and the vision measurement device, controlling the other one of the inertial measurement device and the vision measurement device to measure and accordingly correcting a posture information, a location information and a velocity information of the carrier and the map.

It is to be understood that both the foregoing general description and the following detailed description are exemplary and explanatory only and are not restrictive of the disclosed embodiments, as claimed.

DETAILED DESCRIPTION OF EXEMPLARY EMBODIMENT OF THE PRESENT DISCLOSURE

First Embodiment: Inertial Measurement Device+Vision Measurement Device (Mono Camera)

Figure 1:
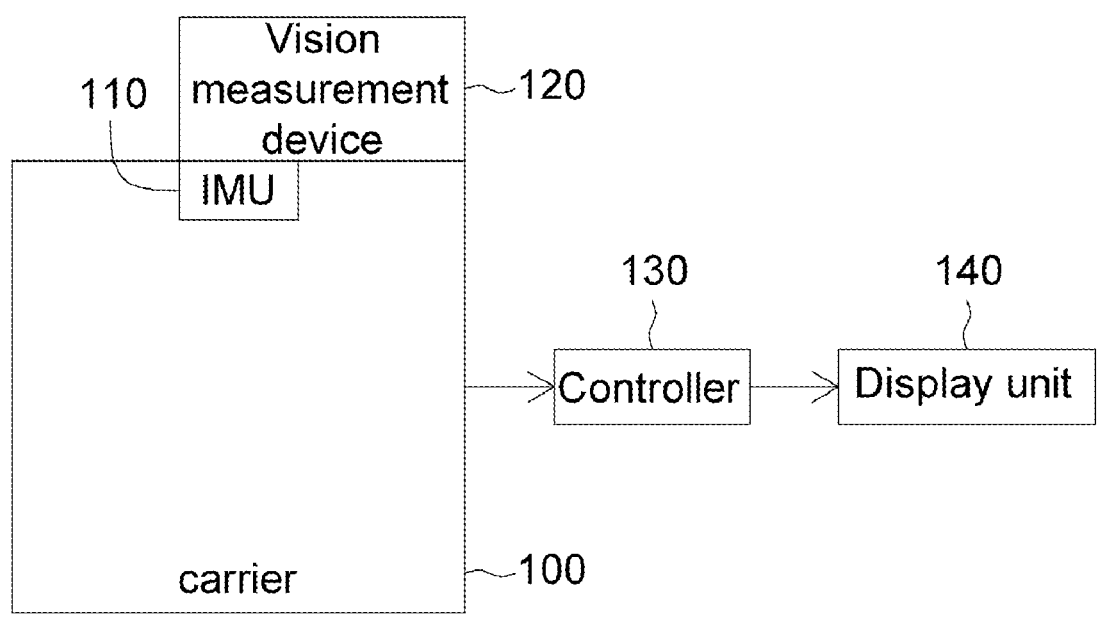
FIG. 1 is a schematic diagram of a system according to a first embodiment of the disclosure.

Referring to FIG. 1, a schematic diagram of a system according to the first embodiment of the disclosure is shown. As shown in FIG. 1, the system according to the first embodiment of the disclosure includes a carrier 100, an inertial measurement device 110, a vision measurement device 120 and a controller 130. The system further includes an optional display unit 140.

The carrier 100 is movable, exemplified but not limited to be an indoor robot (which is capable of performing indoor positioning), a personal navigation system, a game player, a vehicle, a motorcycle, a bicycle, a pair of glasses, a watch, a helmet or any other movable object.

The inertial measurement device 110 can be an accelerometer, a gyroscope, a tachometer matrix, any other sensor capable of measuring dynamic parameters of objects, or any combination thereof. The accelerometer can measure a motion state (e.g. acceleration information) of the carrier while the gyroscope can measure a rotation state (e.g. angular velocity information) of the carrier. Based on a measuring result of the inertial measurement device 110, the controller 130 can estimate a carrier posture, a carrier velocity and a carrier location of the moving carrier. The controller 130 can perform an integral calculation on the parameters, such as the acceleration and the angular velocity, measured by the inertial measurement device 110 to obtain a velocity information, a posture information and a location information of the carrier 100. However, errors (e.g. velocity error, placement error, posture error) accumulated during a long period of integral calculation cannot be eliminated by just using the measuring result of the inertial measurement device 110. Besides, the measurement accuracy of the inertial measurement device 110 will not be negatively affected by dim or dark environment. The inertial measurement device 110 has a high measuring speed. Under control of the controller 130, the inertial measurement device 110 measures and sends the measuring result back to the controller 130.

In the first embodiment, the vision measurement device 120 is for example a mono camera and disposed on a surface of the carrier 100 to picture environment feature(s) of the indoor environment. Based on the measuring result of the vision measurement device 120, the controller 130 can measure movement of the environment features and estimate the motion states and/or rotation states of the carrier. The vision measurement device 120 is easily affected by the dim or dark environment, and under the situation that the images of the environment features are blurred (such as a white object located in front of a white wall), only based on the measuring result of the vision measurement device, the controller is impossible to localize the position of the carrier relative to the environment characteristics. The vision measurement device has a lower rate of measuring operation and the controller performs complicated calculation on the measuring result of the vision measurement device. Without the measuring result of the inertial measurement device, only based on the measuring result of the vision measurement device, the controller 130 requires a large amount of calculation to obtain a three-dimensional (3-D) state of the carrier. If the carrier is in a highly-moving state, the calculation will diverge easily, which may lead to a malfunction of the system. For this reason, under assistance of the inertial measurement device, when the controller calculates the 3-D state of the carrier, the controller can rely on not just the measuring result of the vision measurement device but also that of the inertial measurement device, thus the calculation amount of the controller can be reduced. Even when the carrier is in a highly-moving state, the calculation will not diverge and the error possibility of the system can be greatly reduced.

Therefore, in the first embodiment, both the inertial measurement device and the vision measurement device are used to calculate the sensor fusion of a probability model and to localize the position of the carrier in the 3-D space and the relative positions (relative to the carrier) of the environment features in the 3D-space, in order to achieve localization, posture estimation and map establishment. The map includes (or is formed by) the environment features, and in the first embodiment, the map can be built real-time even if the carrier is in movement or in rotation.

The controller 130 is coupled to the inertial measurement device 110, the vision measurement device 120 and the display unit 140. Although in FIG. 1, the controller 130 is located outside the carrier 100, in another embodiment, the controller 130 can be located inside the carrier 100. The controller 130 controls operations of the inertial measurement device 110 and the vision measurement device 120, receives the measuring results from the measurement devices and performs calculation to estimate posture and location of the carrier and to establish the map including the environment features.

The display unit 140 is coupled to the controller 130. Under control of the controller 130, the display unit 140 generates a response interacting with the exterior. For example, the response from the display unit 140 to the user is for example a video/audio signal, music or a pre-recorded voice. Besides, the display unit 140 can also display pictures, texts, colors, light and shade, flash, and figures. The video/audio signal provided by the display unit 140 includes at least one of an audio signal, a video signal and an indication signal, or the combination thereof.

Figure 2:
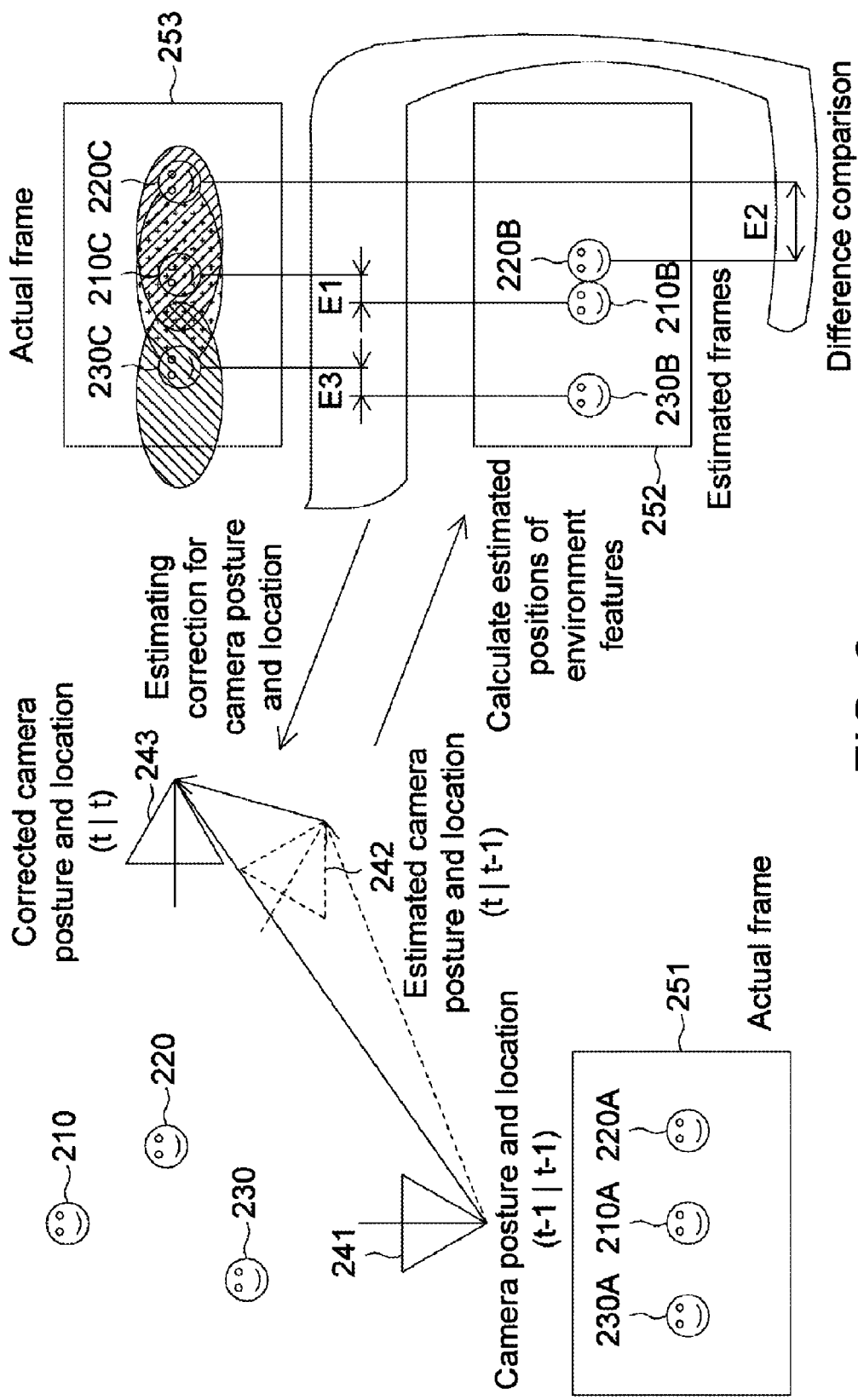
FIG. 2 is a schematic diagram illustrating estimate of states of a carrier based on an inertial measurement device and a vision measurement device according to the first embodiment of the disclosure.

Referring to FIG. 2, a diagram illustrating how to estimate the carrier state based on the inertial measurement device and the vision measurement device is shown. FIG. 2 is a schematic diagram illustrating a vision simultaneous localization and mapping (VSLAM). In FIG. 2, the reference numbers 210~230 symbolize three environment features in the environment. It is noted that although three environment features are exemplified here, the embodiment is not limited thereto.

At time (t−1), the posture and the location (t−1|t−1) of the carrier 100 is shown by the reference number 241. Further, at time (t−1), the vision measurement device 120 pictures an actual frame 251 which shows actual positions 210A~230A of the environment features.

Due to the movement or rotation of the carrier 100, at time t, based on the measuring result of the inertial measurement device 110, the controller 130 estimates an uncorrected posture and location (t|t−1) of the carrier 100, as shown by the reference number 242.

Based on the uncorrected posture and location (t|t−1) 242, the controller 130 estimates a frame 252 which includes estimated positions 210B~230B of the environment features.

At time t, under control of the controller 130, the vision measurement device pictures an actual frame 253 and sends it back to the controller 130. The actual frame 253 includes actual positions 210C~230C of the environment features. The controller 130 compares the estimated positions 210B~230B and the actual positions 210C~230C of the environment features to calculate errors E1~E3. The errors may include errors generated when the controller 130 predicts the positions of the environment features and/or errors generated when the controller 130 predicts the posture and location of the carrier 100.

In the first embodiment, the controller 130 corrects the position errors of the environment features one by one, or corrects the position errors of the environment features simultaneously. In the embodiment, there are various methods for error correction, such as the correction is according to an average of the errors E1~E3.

Based on the errors E1~E3, the controller 130 calculates correction for the posture and location of the carrier 100 and accordingly corrects a posture state and a location state of the carrier 100, as shown by the reference number 243. When the controller 130 controls the inertial measurement device 110 to measure, the controller 130 first predicts based on the corrected posture and location information (t|t) 243 so as to correct accumulation errors caused by an integral result of the inertial measurement device 110.

As mentioned above, in the first embodiment, to estimate the posture and location of the carrier 100 and to establish the map, required are estimation (performed by the controller), measuring (performed by one of the measurement devices) and correction (performed by the controller). When the controller 130 is performing estimation, the controller 130 estimates based on a corrected result on the measuring result from one of the measurement devices. Then, the controller 130 controls the other one of the measurement devices to perform measurement and performs correction based on the measured information from the other one of the measurement devices.

Figure 3:
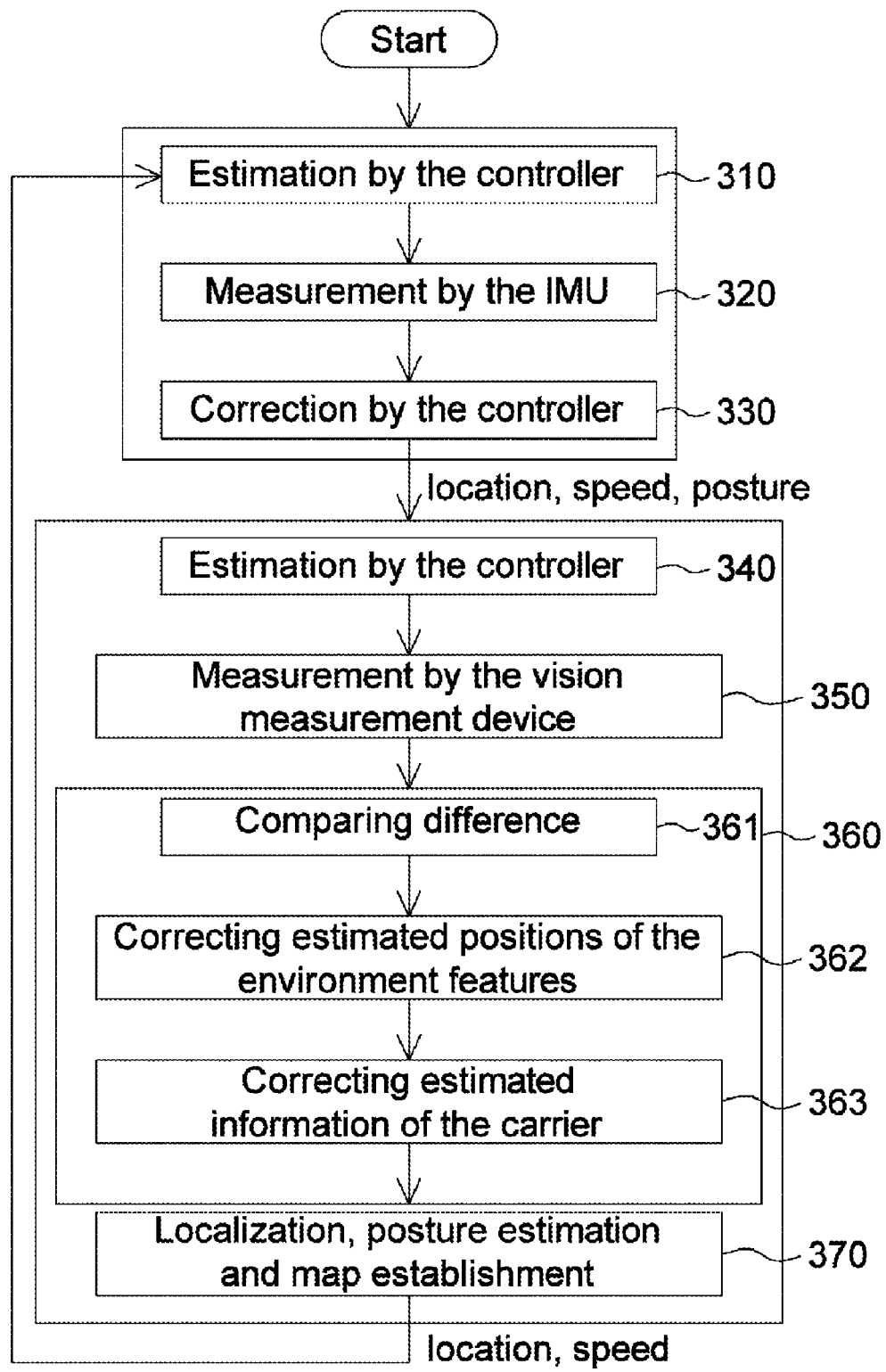
FIG. 3 is a schematic flow chart according to the first embodiment of the disclosure.

Referring to FIG. 3, a flow chart according to the first embodiment of the disclosure is shown. As shown in the step 310, before controlling the inertial measurement device to measure, the controller first estimates the 3-D posture, velocity and location of the carrier.

Next, in step 320, under control of the controller, the inertial measurement device measures a motion state (e.g. acceleration information) and a rotation state (e.g. angular velocity information) of the carrier and sends the measuring result back to the controller.

Afterwards, in step 330, based on the measuring result from the inertial measurement device, the controller corrects the estimated 3-D posture, the estimated velocity and the estimated location of the carrier.

On the other hand, as shown in step 340, before controlling the vision measurement device to measure, the controller performs estimation (e.g. estimation on the 3-D posture, velocity and location of the carrier) first. In the embodiment, after the controller obtains a corrected result of the measuring result of the inertial measurement device, the controller performs the estimation step 340 based on the corrected result of the measuring result of the inertial measurement device.

Following that, in step 350, under control of the controller, the vision measurement device performs measurement (i.e. the vision measurement device pictures frames) and sends the measuring result back to the controller.

Then, in step 360, based on the measuring result from the vision measurement device, the controller corrects the estimated 3-D posture, the estimated velocity and the estimated location of the carrier. To describe in more details, as shown in step 361, based on the actual frames pictured by the vision measure device, the controller compares difference between the estimated positions and actual positions of the environment features to calculate error.

Next, in step 362, based on the calculated error, the controller corrects the estimated positions of the environment features. In step 362, the controller corrects position errors of all the environment features one by one, or corrects position errors of all the environment features simultaneously.

As shown in the step 363, based on the calculated error of the above step 362, the controller corrects the estimated information, such as the estimated position and the estimated posture, of the carrier.

As shown in step 370, through estimation, measurement and correction, it achieves to localize the carrier, estimate the 3-D posture of the carrier and establish the environment map (including the environment features).

If the controller has obtained the corrected result on the measuring result of the vision measurement device (i.e. the step 370 has been completed) before the controller is to perform the estimation step 310, the controller performs the estimation step 310 based on the corrected result. Similarly, if the controller obtains the corrected result on the measuring result of the inertial measurement device (i.e. the step 330 has been completed) before the controller performs the estimation step 340, the controller performs the estimation step 340 based on the corrected result.

In the embodiment, if the operational speeds of the inertial measurement device and the vision measurement device are not synchronized (normally the inertial measurement device has a higher operational speed than the vision measurement device), in FIG. 3, the operations of the steps 310~330 are not synchronized with the steps 340~370.

In the following description, the detailed operations of the first embodiment will be illustrated. The state of positioning by the inertial measurement device is defined as below:

$$x_t = g(x_{t-1}, u_t) + \epsilon_t$$

$$z_t = h(x_t) + \delta_t$$

Supposed the motion model is $X_t = g(X_{t-1}, U_t) + \epsilon_t$, then the carrier state is:

$$X_t = [X_{G,t} V_{x,t} A_{x,t} Y_{G,t} V_{y,t} A_{y,t} Z_{z,t} V_{z,t} A_{z,t} e_{1,t} e_{2,t} e_{3,t}]^T,$$

wherein $[X_{G,t} Y_{G,t} Z_{G,t}]^T$ is an absolute position of the carrier in a global coordinate, $[V_{x,t} V_{y,t} V_{z,t}]^T$ is a velocity of the carrier in a carrier coordinate, $[A_{x,t} A_{y,t} A_{z,t}]^T$ is an acceleration of the carrier in the carrier coordinate, $[e_{0,t} e_{1,t} e_{2,t} e_{3,t}]^T$ is a quaternion of the carrier in the carrier coordinate, and are $U_t = [a_{x,t} a_{y,t} a_{z,t} \omega_{x,t} \omega_{y,t} \omega_{z,t}]^T$ are acceleration and angular velocity of the carrier in the carrier coordinate.

To calculate the absolute position $B_t$ of the carrier in the global coordinate at time t, it requires the absolute position of the carrier in the global coordinate at time (t−1) and an integral information of the acceleration and angular velocity obtained by the acceleration sensor and gyroscope on the carrier; and the carrier coordinate information in the carrier coordinate should be transformed into the carrier coordinate information in the global coordinate based on quaternion. Moreover, the above process is completed in a motion model.

The motion model of a carrier state is represented as below:

$$\begin{bmatrix} X_{G,t} \\ V_{x,t} \\ A_{x,t} \\ Y_{G,t} \\ V_{y,t} \\ A_{y,t} \\ Z_{G,t} \\ V_{z,t} \\ A_{z,t} \\ e_{0,t} \\ e_{1,t} \\ e_{2,t} \\ e_{3,t} \end{bmatrix} = \begin{bmatrix} 1 & R_{11}t & 0.5R_{11}t^2 & 0 & R_{12}t & 0.5R_{12}t^2 & 0 & R_{13}t & 0.5R_{13}t^2 & 0 & 0 & 0 & 0 \\ 0 & 1 & 0 & 0 & \omega_{z,t}t & 0 & 0 & -\omega_{y,t}t & 0 & 0 & 0 & 0 & 0 \\ 0 & 0 & 0 & 0 & 0 & 0 & 0 & 0 & 0 & 0 & 0 & 0 & 0 \\ 0 & R_{21}t & 0.5R_{21}t^2 & 1 & R_{22}t & 0.5R_{22}t^2 & 0 & R_{23}t & 0.5R_{23}t^2 & 0 & 0 & 0 & 0 \\ 0 & -\omega_{z,t}t & 0 & 0 & 1 & 0 & 0 & -\omega_{x,t}t & 0 & 0 & 0 & 0 & 0 \\ 0 & 0 & 0 & 0 & 0 & 0 & 0 & 0 & 0 & 0 & 0 & 0 & 0 \\ 0 & R_{31}t & 0.5R_{31}t^2 & 0 & R_{32}t & 0.5R_{32}t^2 & 1 & R_{33}t & 0.5R_{33}t^2 & 0 & 0 & 0 & 0 \\ 0 & \omega_{y,t}t & 0 & 0 & -\omega_{x,t}t & 0 & 0 & 1 & 0 & 0 & 0 & 0 & 0 \\ 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 1 & -0.5\omega_{z,t}t & -0.5\omega_{y,t}t & -0.5\omega_{z,t}t \\ 0 & 0 & 0 & 0 & 0 & 0 & 0 & 0 & 0 & 0.5\omega_{x,t}t & 1 & 0.5\omega_{y,t}t & -0.5\omega_{z,t}t \\ 0 & 0 & 0 & 0 & 0 & 0 & 0 & 0 & 0 & 0.5\omega_{y,t}t & -0.5\omega_{z,t}t & 1 & 0.5\omega_{x,t}t \\ 0 & 0 & 0 & 0 & 0 & 0 & 0 & 0 & 0 & -0.5\omega_{z,t}t & 0.5\omega_{y,t}t & 0.5\omega_{x,t}t & 1 \end{bmatrix}$$

$$\begin{bmatrix} X_{G,t-1} \\ V_{x,t-1} \\ A_{x,t-1} \\ Y_{G,t-1} \\ V_{y,t-1} \\ A_{y,t-1} \\ Z_{G,t-1} \\ V_{z,t-1} \\ A_{z,t-1} \\ e_{0,t-1} \\ e_{1,t-1} \\ e_{2,t-1} \\ e_{3,t-1} \end{bmatrix} + \begin{bmatrix} 0 \\ (a_{x,t} - g_{x,t})t \\ (a_{x,t} - g_{x,t}) \\ 0 \\ (a_{y,t} - g_{y,t})t \\ (a_{y,t} - g_{y,t}) \\ 0 \\ (a_{z,t} - g_{z,t})t \\ (a_{z,t} - g_{z,t}) \\ 0 \\ 0 \\ 0 \\ 0 \end{bmatrix} + \varepsilon_t$$

The motion model of a map state is:

$$\begin{bmatrix} m^i_{x,t} \\ m^i_{y,t} \\ m^i_{z,t} \end{bmatrix}_t = \begin{bmatrix} 1 & 0 & 0 \\ 0 & 1 & 0 \\ 0 & 0 & 1 \end{bmatrix} \begin{bmatrix} m^i_{x,t} \\ m^i_{y,t} \\ m^i_{z,t} \end{bmatrix}_{t-1},$$

wherein $g_{x,t}$ is an x-component of the gravity acceleration in the carrier coordinate, $g_{y,t}$ is a y-component of the gravity acceleration in the carrier coordinate, $g_{z,t}$ is a z-component of the gravity acceleration in the carrier coordinate, $\epsilon_t$ is sensor noise, $R_{11} \sim R_{33}$ are parameters in a direction cosine matrix.

$$\begin{bmatrix} x' \\ y' \\ z' \end{bmatrix} = \begin{bmatrix} R_{11} & R_{12} & R_{13} \\ R_{21} & R_{22} & R_{23} \\ R_{31} & R_{32} & R_{33} \end{bmatrix} \begin{bmatrix} x \\ y \\ z \end{bmatrix}$$

$$= \begin{bmatrix} e_0^2 + e_1^2 - e_2^2 - e_3^2 & 2(e_1 e_2 + e_0 e_3) & 2(e_1 e_3 - e_0 e_2) \\ 2(e_1 e_2 - e_0 e_3) & e_0^2 - e_1^2 + e_2^2 - e_3^2 & 2(e_2 e_3 + e_0 e_1) \\ 2(e_1 e_3 + e_0 e_2) & 2(e_2 e_3 - e_0 e_1) & e_0^2 - e_1^2 - e_2^2 + e_3^2 \end{bmatrix}$$

$$\begin{bmatrix} x \\ y \\ z \end{bmatrix}$$

Through the above motion models, the position $[X_{G,t}\ Y_{G,t}\ Z_{G,t}]^T$ of the carrier in the 3D space, the acceleration $[A_{x,t}\ A_{y,t}\ A_{z,t}]^T$ of the carrier in the carrier coordinate, the velocity $[V_{x,t}\ V_{y,t}\ V_{z,t}]^T$ of the carrier in the carrier coordinate and the quaternion $[e_{0,t}\ e_{1,t}\ e_{2,t}\ e_{3,t}]^T$ of the carrier can be obtained.

The calculated carrier state includes the acceleration sensor noises and the gyroscope sensor noises, and thus it needs to correct the errors. Therefore, in the embodiment, the vision measurement device is used as a sensor model to correct the states estimated based on results from the acceleration sensor and the gyroscope. The mono camera has lower cost, but a distance of the camera relative to the feature is calculated through time difference.

In the following description, the operation of the inertial measurement device (IMU) with the mono camera is illustrated. The system state obtained in combination of the inertial measurement device (IMU) and the mono camera is represented as below:

$$\hat{X} = [\hat{x}_v^T\ \hat{y}_0^T\ \hat{y}_1^T \ldots \hat{y}_{n-1}^T]^T$$

The system state includes a camera state and the states of all the environment features. Mathematically, it is symbolized as a one-dimensional vector, and the magnitude of the vector is almost positive proportional to the number of the environment features.

Camera State

The camera state includes a position vector of the camera, an orientation vector of the camera in rotation, a linear velocity vector of the camera and an angular velocity vector of the camera in rotation. The mathematic pattern of the camera state is a 13×1 one-dimensional vector.

$$\hat{x}_v = [\hat{r}\ \hat{q}\ \hat{v}\ \hat{\omega}]^T = [[x\ y\ z]\ [q_0\ q_1\ q_2\ q_3]\ [v_x\ v_y\ v_z]\ [\omega_x\ \omega_y\ \omega_z]]^T$$

$\hat{r}$ is a position vector of the camera, $\hat{q}$ is a quaternion vector of the camera rotation orientation, $\hat{v}$ is a linear velocity vector of the camera and $\hat{\omega}$ is an angular velocity vector of the camera in rotation.

Feature State

The feature state records the coordinates of the environment features in space, normally represented by a 3×1 one-dimensional vector.

$$\hat{y}_i\ y_i\ z_i$$

Motion Model

The motion model defines variation of the system state between each frame, which is a second-order motion equation represented as below:

$$\hat{x}_{v,t|t-1} = \begin{bmatrix} \hat{r} & \hat{q} & \hat{v} & \hat{\omega} \end{bmatrix}^T_{t|t-1}$$

$$= [\hat{r}_{t-1|t-1} + (\hat{v}_{t-1|t-1} + 0.5\hat{a}_{t-1|t-1}\Delta t)\Delta t$$

$$\hat{q}_{t-1|t-1} + Q(\hat{\omega}_{t-1|t-1} + 0.5\hat{\alpha}_{t-1|t-1}\Delta t)\Delta t$$

$$\hat{v}_{t-1|t-1} + 0.5\hat{a}_{t-1|t-1}\Delta t$$

$$\hat{\omega}_{t-1|t-1} + 0.5\hat{\alpha}_{t-1|t-1}\Delta t]^T$$

wherein $\hat{a}$ is a linear acceleration, $\hat{\alpha}$ a rotational acceleration, $\Delta t$ is a time duration for state update, and $Q(x)$ is a transformation function from Euler angles into quaternion.

Observation Model

If a different observation model is adopted and the observation vector has higher dimension, the dimension of the Kalman gain is increased linearly.

In the first embodiment, the observation model defines how to calculate the imaging positions of the features in the camera based on the posture and the position of the camera and the coordinates of space features.

$$\begin{bmatrix} u_i \\ v_i \end{bmatrix} = \begin{bmatrix} u_0 - \dfrac{k_u f \dfrac{x_i^r}{z_i^r}}{\sqrt{1+2K\left(\left(k_u f \dfrac{x_i^r}{z_i^r}\right)^2 + \left(k_v f \dfrac{y_i^r}{z_i^r}\right)^2\right)}} \\ v_0 - \dfrac{k_v f \dfrac{y_i^r}{z_i^r}}{\sqrt{1+2K\left(\left(k_u f \dfrac{x_i^r}{z_i^r}\right)^2 + \left(k_v f \dfrac{y_i^r}{z_i^r}\right)^2\right)}} \end{bmatrix}$$

wherein $(u_0, v_0)$ is a center coordinate of the frame (the coordinate of the left-upper corner is (0,0)), $(k_u, k_v)$ are respectively a length reciprocal and a width reciprocal of a pixel, K is a distortion coefficient of a camera and $(x, y, z)_i^r$ is a coordinate of the environment feature $\hat{y}_i$ relative to the camera.

System Covariance Matrix

The system covariance matrix defines variation relationship between the elements in the system state vector and includes self-uncertainty of each element. The size of the system covariance matrix is proportional to a square of the number of the environment features. In estimation-measurement-correction for an environment characteristic, calculated are the system covariance matrix related to the camera and the feature subjected to estimation-measurement-correction. The system covariance matrix is represented as below:

$$P = \begin{bmatrix} P_{xx} & P_{xy_0} & P_{xy_1} & \cdots & P_{xy_{n-1}} \\ P_{y_0 x} & P_{y_0 y_0} & P_{y_0 y_1} & \cdots & \cdots \\ P_{y_1 x} & P_{y_1 y_0} & P_{y_1 y_1} & \cdots & \cdots \\ \cdots & \cdots & \cdots & \cdots & \cdots \\ P_{y_{n-1} x} & P_{y_{n-1} y_0} & \cdots & \cdots & P_{y_{n-1} y_{n-1}} \end{bmatrix}_{(n+1)\times(n+1)}$$

wherein each parameter symbolizes n coexisting features and n can be any positive integer.

Second Embodiment

Inertial Measurement Device+Vision Measurement Device (Stereo Vision Camera)

In the second embodiment, the vision measurement device 120 is a stereo vision camera and disposed on a surface of the carrier 100 to picture the environment features in the indoor environment. The stereo vision camera has higher cost but can obtain the depth information of the camera relative to the environment at the same time.

Observation Model of Stereo Vision Camera

In principle, the model of the second embodiment is similar to or the same as that of the first embodiment, but the observation model of the stereo vision camera of the second embodiment is different from the observation model of the mono camera of the first embodiment.

In the second embodiment, the observation model of the stereo vision camera defines how to calculate the imaging positions of the environment features in the left camera and in the right camera based on the posture and the position of the camera and the coordinates of environment features. Supposed the left camera and right camera have the same intrinsic parameters.

$$\begin{bmatrix} u_i^L \\ v_i^L \\ u_i^R \\ v_i^R \end{bmatrix} = \begin{bmatrix} u_0^L - \dfrac{k_u f \dfrac{x_i^{rL}}{z_i^{rL}}}{\sqrt{1+2K\left(\left(k_u f \dfrac{x_i^{rL}}{z_i^{rL}}\right)^2 + \left(k_v f \dfrac{y_i^{rL}}{z_i^{rL}}\right)^2\right)}} \\ v_0^L - \dfrac{k_v f \dfrac{y_i^{rL}}{z_i^{rL}}}{\sqrt{1+2K\left(\left(k_u f \dfrac{x_i^{rL}}{z_i^{rL}}\right)^2 + \left(k_v f \dfrac{y_i^{rL}}{z_i^{rL}}\right)^2\right)}} \\ u_0^R - \dfrac{k_u f \dfrac{x_i^{rR}}{z_i^{rR}}}{\sqrt{1+2K\left(\left(k_u f \dfrac{x_i^{rR}}{z_i^{rR}}\right)^2 + \left(k_v f \dfrac{y_i^{rR}}{z_i^{rR}}\right)^2\right)}} \\ v_0^R - \dfrac{k_v f \dfrac{y_i^{rR}}{z_i^{rR}}}{\sqrt{1+2K\left(\left(k_u f \dfrac{x_i^{rR}}{z_i^{rR}}\right)^2 + \left(k_v f \dfrac{y_i^{rR}}{z_i^{rR}}\right)^2\right)}} \end{bmatrix}$$

$(u_0^L, v_0^L, u_0^R, v_0^R)$ are respectively center coordinates of frames in the left camera and in right camera (the coordinate of the left-upper corner is (0,0)), $(k_u, k_v)$ are respectively a length reciprocal and a width reciprocal of a pixel, which are supposed to be the same in the stereo vision camera, K is a camera wide-angle torsion coefficient, $(x,y,z)_i^{rL}$ and $(x,y,z)_i^{rR}$ are respectively coordinates of the environment feature LP, relative to the left camera and the right camera, whose relationship is as following:

wherein $T_{R2L}$ is a shift vector from a right-camera coordinate system to a left-camera coordinate system.

To sum up, in the first embodiment, the vision measurement device can measure the imaging frame coordinates (u,v) of the environment features in the camera. In the second embodiment, the measurement state of the vision measurement device may be defined by two ways: doubling the single mono camera of the first embodiment to two mono cameras to obtain two groups (u,v) relative to the two mono cameras; and using the stereo vision camera as a single sensor to measure the coordinates (x, y, z) of the environment features in space.

In other embodiments of the disclosure, the vision measurement device can include one or more mono cameras, or one or more holograph lens cameras.

According to the above-mentioned two embodiments and other possible embodiments of the disclosure, estimation (the carrier posture, velocity, angular velocity and location, and the positions of the environment features and relative distances therebetween) can be performed based on fusion of measuring results from the measurement devices. The state estimation (prediction) can be achieved by using the inertial measurement device (the gyroscope and acceleration sensor) and the vision measurement device (the mono camera and stereo vision camera) to localize the relative position of the moving carrier in the space and the positions of the environment features relative to the moving carrier. By using two complementary measurement devices, the complexity of calculation can be greatly reduced to enlarge a dynamic detection range for the carrier so as to achieve positioning of the 3-D moving carrier (even achieve a high-speed real-time positioning).

Besides, the embodiments of the disclosure can co-work with an outdoor positioning system to compensate the inadequacy of the outdoor positioning system.

It will be appreciated by those skilled in the art that changes could be made to the disclosed embodiments described above without departing from the broad inventive concept thereof. It is understood, therefore, that the disclosed embodiments are not limited to the particular examples disclosed, but is intended to cover modifications within the spirit and scope of the disclosed embodiments as defined by the claims that follow.

What is claimed is:

1. A system for localizing a carrier, estimating a posture of the carrier and establishing a map, comprising:
    an inertial measurement device, for measuring a motion state and a rotation state of the carrier;
    a vision measurement device, disposed on a surface of the carrier for picturing at least an environment feature in an indoor environment where the carrier locates; and
    a controller, for controlling the inertial measurement device and the vision measurement device, receiving a measuring result from the inertial measurement device and a measuring result from the vision measurement device to estimate a posture information, a location information and a velocity information of the carrier and establishing a map having the environment feature;
    wherein the controller estimates based on a corrected measuring result of one of the inertial measurement device and the vision measurement device, then the controller controls the other one of the inertial measurement device and the vision measurement device to measure and accordingly correct the posture information, the location information and the velocity information of the carrier and the map;
    wherein, before controlling the inertial measurement device to measure, the controller estimates the posture information, the location information and the velocity information of the carrier;
    if the controller already calculated the corrected measuring result of the vision measurement device before the controller estimates, the controller estimates based on the corrected measuring result of the vision measurement device;
    under control of the controller, the inertial measurement device measures the motion state and the rotation state of the carrier and sends the measuring result back to the controller; and
    the controller corrects the posture information, the location information and the velocity information based on the measuring result of the inertial measurement device.

2. The system according to claim 1, wherein the motion state comprises at least an acceleration information and the rotation state comprises at least an angular velocity information.

3. The system according to claim 2, wherein:
    before controlling the vision measurement device to measure, the controller estimates the posture information, the location information and the velocity information of the carrier;
    if the controller already calculated the corrected measuring result of the inertial measurement device before the controller estimates, the controller estimates based on the corrected measuring result of the inertial measurement device;
    under control of the controller, the vision measurement device pictures a frame of the environment feature of the indoor environment where the carrier locates and sends the measuring result back to the controller; and
    the controller corrects the posture information, the location information and the velocity information based on the measuring result of the vision measurement device.

4. The system according to claim 3, wherein:
    based on an actual frame pictured by the vision measurement device, the controller compares a difference between an estimated position and an actual position of the environment feature to calculate an error;
    based on the error, the controller corrects the estimated position of the environment feature and updates the map; and
    the controller corrects the posture information, the location information and the velocity information based on the error.

5. The system according to claim 4, wherein if the indoor environment comprises a plurality of environment features, the controller corrects respective estimated positions of the environment features one by one or the controller corrects the estimated positions of the environment features simultaneously.

6. The system according to claim 1, wherein the vision measurement device comprises one or a plurality of mono cameras, or one or a plurality of camera arrays, or any combination thereof.

7. The system according to claim 1, wherein the inertial measurement device comprises an accelerometer, a gyroscope, or a tachometer matrix, or any combination thereof.

8. The system according to claim 1, further comprising:
    a display unit, coupled to the controller for generating a response interacting with exterior under control of the controller.

9. The system according to claim 8, wherein the display unit displays a video/audio signal, music, a pre-recorded voice.

10. A method for localizing a carrier, estimating a posture of the carrier and establishing a map, comprising:
    measuring a motion state and a rotation state of the carrier by using an inertial measurement device;
    picturing at least an environment feature of an indoor environment where the carrier locates;
    estimating based on a corrected measuring result of one of the inertial measurement device and the vision measurement device, controlling the other one of the inertial measurement device and the vision measurement device to measure, and accordingly correcting a posture information, a location information and a velocity information of the carrier and the map;
    before the inertial measurement device measures, estimating the posture information, the location information and velocity information of the carrier;
    if the corrected measuring result of the vision measurement device is already calculated before the estimating step, estimating based on the corrected measuring result of the vision measurement device;
    measuring the motion state and the rotation state of the carrier and sending back the measuring result of the inertial measurement device; and
    correcting the posture information, the location information and the velocity information based on the measuring result of the inertial measurement device.

11. The method according to claim 10, wherein:
    before the vision measurement device measures, estimating the posture information, the location information and the velocity information of the carrier;

if the corrected measuring result of the inertial measurement device is already calculated before the estimating step, estimating based on the corrected measuring result of the inertial measurement device;

picturing a frame of the environment feature of the indoor environment where the carrier locates, and sending back the measuring result; and correcting the posture information, the location information and the velocity information based on the measuring result of the vision measurement device.

12. The method according to claim 11, further comprising:

comparing a difference between an estimated position and an actual position of the environment feature based on an actual frame pictured by the vision measurement device to calculate an error;

correcting the estimated position of the environment feature and updating the map based on the error; and correcting the posture information, the location information and the velocity information based on the error.

13. The method according to claim 12, wherein if the environment has a plurality of environment features, the estimated positions of the environment features are corrected one by one or the estimated positions of the environment features are corrected simultaneously.

* * * * *